United States Patent
Gruber et al.

(10) Patent No.: US 9,320,118 B2
(45) Date of Patent: Apr. 19, 2016

(54) LED POWER SUPPLY DEVICE

(75) Inventors: Stephan Gruber, Chemnitz (DE); Rene Franzky, Chemnitz (DE); Winfried Beyer, Chemnitz (DE); Gerd Meyhofer, Dresden-Langenbruck (DE)

(73) Assignee: EXSCITRON GMBH, Chemnitz (DE)

( * ) Notice: Subject to any disclaimer, the term of this patent is extended or adjusted under 35 U.S.C. 154(b) by 77 days.

(21) Appl. No.: 13/491,794

(22) Filed: Jun. 8, 2012

(65) Prior Publication Data

US 2012/0313537 A1    Dec. 13, 2012

(30) Foreign Application Priority Data

Jun. 10, 2011    (EP) .................................... 11169425

(51) Int. Cl.
  H05B 37/02    (2006.01)
  H05B 33/08    (2006.01)
  H02M 3/335    (2006.01)
  H02M 1/00    (2007.01)

(52) U.S. Cl.
  CPC ........ H05B 37/0254 (2013.01); H05B 33/0815 (2013.01); H05B 33/0845 (2013.01); H02M 3/33507 (2013.01); H02M 2001/0006 (2013.01); H02M 2001/0032 (2013.01); Y02B 20/346 (2013.01); Y02B 70/16 (2013.01)

(58) Field of Classification Search
  CPC .................................................. H05B 33/0803
  USPC ............... 315/247, 291, 307–312, 185 S, 188
  See application file for complete search history.

(56) References Cited

U.S. PATENT DOCUMENTS

| | | | |
|---|---|---|---|
| 7,564,706 B1 * | 7/2009 | Herbert | 363/124 |
| 8,587,221 B2 * | 11/2013 | Liu | 315/307 |
| 8,638,045 B2 * | 1/2014 | Kunst et al. | 315/291 |
| 2004/0140777 A1 | 7/2004 | Fosler | |
| 2008/0278092 A1 * | 11/2008 | Lys et al. | 315/247 |
| 2010/0207539 A1 | 8/2010 | Haeusser | |
| 2010/0225240 A1 | 9/2010 | Shearer et al. | |

(Continued)

FOREIGN PATENT DOCUMENTS

| | | |
|---|---|---|
| DE | 10329876 A1 | 1/2005 |
| DE | 102008017557 A1 | 10/2009 |

(Continued)

OTHER PUBLICATIONS

Office Action dated Jun. 21, 2013 issued by the German Patent and Trademark Office from corresponding application No. 10 2012 104 898.3 (five (5) pages) (including English tranlation).

*Primary Examiner* — Tuyet Vo
(74) *Attorney, Agent, or Firm* — Kacvinsky Daisak Bluni PLLC

(57) ABSTRACT

An LED power supply device includes a power supply to control an LED component, a control unit (with control interface) to control the power supply, and a voltage supply unit connected to a connection of the power supply. the control unit receives operating voltage from the voltage supply unit for continuous operation in an activated and non-activated control state of the LED component, and the voltage supply unit uses a capacitor coupled to an output side of the power supply to supply a capacitor voltage as operating voltage to the LED power supply device. The control unit is configured to charge the capacitor using pulse-like control of the power supply such that, in the non-activated control state, the maximum charging voltage lies below the LED threshold voltage.

22 Claims, 4 Drawing Sheets

(56) References Cited

U.S. PATENT DOCUMENTS

| | | | |
|---|---|---|---|
| 2010/0225278 A1* | 9/2010 | Reefman et al. | 320/135 |
| 2010/0244726 A1* | 9/2010 | Melanson | 315/291 |
| 2011/0194315 A1* | 8/2011 | Gaknoki et al. | 363/21.17 |
| 2011/0204803 A1* | 8/2011 | Grotkowski et al. | 315/194 |
| 2012/0025729 A1* | 2/2012 | Melanson et al. | 315/224 |
| 2012/0223649 A1* | 9/2012 | Saes et al. | 315/186 |
| 2013/0162158 A1* | 6/2013 | Pollischansky | 315/201 |

FOREIGN PATENT DOCUMENTS

| | | |
|---|---|---|
| DE | 102009033280 A1 | 3/2011 |
| EP | 0393280 A2 | 10/1990 |
| EP | 0749199 A1 | 12/1996 |
| EP | 1231821 A1 | 8/2002 |
| EP | 1374366 B1 | 11/2005 |
| EP | 2259415 A2 | 12/2010 |
| EP | 2270965 A1 | 1/2011 |
| WO | 02-082618 A1 | 10/2002 |

\* cited by examiner

LED POWER SUPPLY DEVICE

BACKGROUND

The present invention relates to an LED power supply device. An exemplary power supply device is described in EP 1 374 366 B1 which is used to minimize the standby power requirements in a digital addressable lighting interface (DALI). DALI refers to an industrial standard used for implementing flexibility in the control of luminaries. In particular, the DALI standard specifies how to control and monitor the status of individual and group addressable lighting equipment such as electronic ballasts and illumination sensors.

An arrangement of an LED power supply device is shown in FIG. 4 according to the prior art. The arrangement includes a two-stage power supply device consisting of a primary stage 10, which is regulated and provided with a power factor correction and a secondary stage 14 which is coupled to the primary stage 10 via a transformer unit 12. The secondary stage 14 is connected at the output side via an output 16 to a power consumer (not shown) that receives power from the power supply device, such as an LED. An output-side smoothing capacitor 18 is provided to ensure that a direct signal that is output from secondary stage 14 is stripped of high-frequency components.

The primary stage 10 of the power supply arrangement of FIG. 4 is controlled by a control unit 20, which is in turn coupled via an interface module 24 to a DALI input connection (DALI line) 22. In addition, a voltage supply module 26 is coupled to the control unit 20, and receives supply voltage from the power supply input connection (Mains) 28. The voltage supply module 26 is connected in such a manner that the control unit 20 can be kept in continuous operation. This arrangement makes it possible to respond at any time to control request or status commands received via the DALI interface 24, particularly during periods when the power supply components 10, 12, 14 and the power consumer coupled to the output 16 are deactivated.

In a prior art power supply device of the type shown in FIG. 4, which embodies the basic principle set forth in EP 1 374 366 B1, a microcontroller is typically used to form the control unit 20 or DALI interface unit 24. Notably, to achieve continuous operation, the voltage supply unit 26 draws electrical power from the power supply input 28. This arrangement is disadvantageous in at least two respects. On the one hand, additional design or circuit outlay is used to support the continuous supply of voltage to the control unit 20. Additionally, the energy balance of a control device constructed in this manner may degrade due to the continuous electrical power consumption, particularly during off, idling or standby operating states of a power consumer connected at the output side 16. This is critical particularly for those arrangements in which the idling, standby or off phases are relatively long in comparison to activation phases, which may lead to the mean power drawn from the mains exceeding predetermined limits.

SUMMARY

It is therefore the object of the present invention to simplify design of an LED power supply device and ensure a permanent operational readiness of the control unit assigned to a power supply, and in particular to make the LED power supply device DALI compatible. As a result, a mean power consumption may be lowered, particularly for devices having alternating activation and deactivation (standby) periods.

These objects are achieved by means of an LED power supply device whose features are set forth below and recited in the present claims. Advantageous embodiments are described in the dependent claims.

In contrast to the prior art, in the present embodiments, the operating voltage of the control unit is advantageously drawn from the output of a power supply rather than from the input. More specifically, the operating voltage of the control unit is drawn from a capacitor voltage of a smoothing-and-buffer capacitor that is located at the power supply output connection to a load, such as an LED means (also referred to herein as an "LED component").

In accordance with the present embodiments, this arrangement enables the power supply output voltage to be used as a "voltage supply unit," so that no separate current supply unit is necessary. Rather, the function of the current supply unit is accomplished by providing suitable functionality of the power supply itself. In this arrangement, the property of the LED component located at the output to act as a load may be exploited. In particular, at voltage levels below the LED threshold voltage, the lighting means are deactivated, i.e., no lighting operation takes place. At the same time, by providing suitable pulse-like control of the control unit, an output voltage signal of the power supply may be used to load the output-side smoothing-and-buffer capacitor. The output-side smoothing-and-buffer capacitor is loaded in such a manner that its capacitor voltage is sufficient to maintain the desired continuous operation of the control unit even though the capacitor voltage remains below the LED threshold voltage.

Therefore, the present embodiments advantageously exploit the ability of a smoothing capacitor (which is typically already present in LED power supply devices and has a large capacitance) to act as a voltage supply of the control unit. In particular, in preferred embodiments, the output-side capacitor is provided with charge pulses that serve two purposes. Firstly, in order to maintain an OFF or standby state, the charge pulses are provided in a manner that prevents the capacitor voltage from reaching the LED means threshold voltage. At the same time, the charge pulses are provided in a manner that maintains the capacitor voltage at or above the minimum operating voltage necessary for continuous operation of the control unit.

According to preferred embodiments, regular periodic charge pulses are used to charge the output-side capacitor. In various embodiments, the ratio of pulse duration (that is, the ON portion of a pulse period) of charge pulses of this type to a total pulse period length is typically below 10%, further preferably below 5% and even further preferably below 2%.

In preferred embodiments, the arrangement of FIG. 1 is used in conjunction with (LED) switching power supplies, which are constructed as single phase at the primary stage and preferably employ a power factor correction (PFC). A secondary stage is coupled to such a primary stage through a transformer unit, and typically includes rectifier means. An output-side capacitor that functions as a smoothing-and-buffer capacitor is connected downstream of the secondary stage. For power supplies having a single phase primary stage, the present embodiments are particularly advantageous, since component and control outlay is considerably reduced compared to conventional designs. Thus, noticeable savings result for power supply costs.

Another advantage provided by the present embodiments is that voltage is supplied to the control unit via an output side voltage supply. Therefore, when the control unit accesses the primary stage of the power supply, it is galvanically isolated from the primary stage along a suitable control line. In some embodiments, this may be accomplished using optocouplers or other devices. For an output that is galvanically isolated from the mains, it is possible to arrange a set of series-connected LEDs so that the total voltage does not exceed the level of 60V. This keeps the total voltage in conformance with the safety extra low voltage (SELV) standard, which enables simpler and less costly mounting of the LED lighting on a heat sink.

In preferred embodiments, a DALI interface is coupled to the control unit. In this respect, EP 1 374 366 B1 and corresponding U.S. Pat. No. 6,762,570 provide an exemplary DALI specification and are incorporated by reference herein in their entirety. In other embodiments, the LED power supply device may employ other control and/or interface configurations. Moreover, the present embodiments also cover other power supply consumers that behave in the manner of an LED, such that operation does not take place below a threshold voltage, but which nonetheless enable continuous operation of a control unit that is buffered by an output capacitance.

Whilst in some embodiments an LED means (component) may be provided in the form of an individual (performance) LED, preferably an LED component contains a group of LED semiconductors (or "LEDs") that are arranged in a series circuit for providing a load. An overall threshold voltage for the LED component thereby results from the sum of the individual threshold voltages of the group of LED semiconductors. In these embodiments, LED series circuits of between 3 and 20 individual LEDs, preferably between 4 and 12 individual LEDs, have proven particularly beneficial.

Further advantages, features and details of the invention result from the following description of preferred exemplary embodiments, as well as on the basis of the figures.

Figure 4:
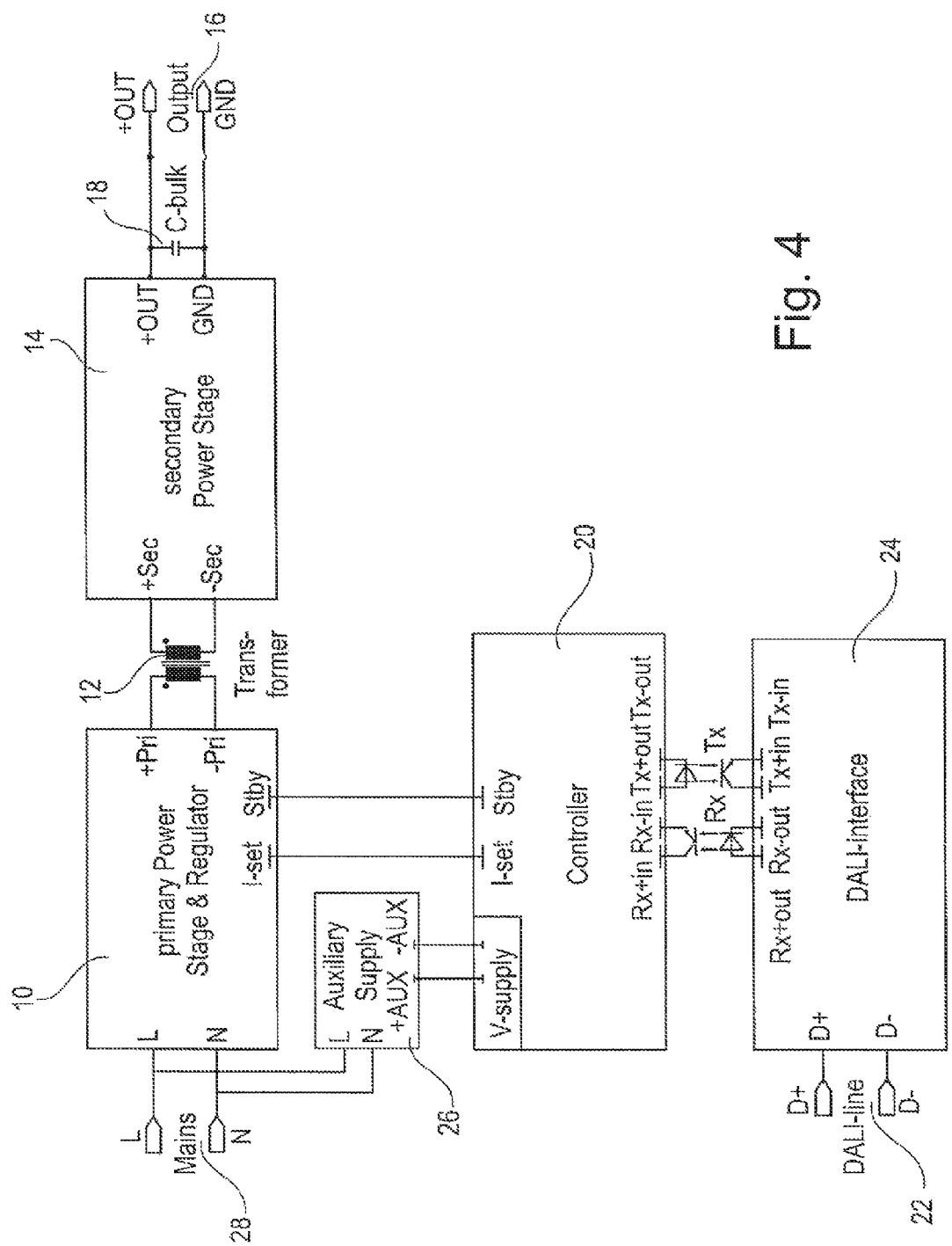
FIG. 4 shows a block diagram analogous to FIG. 1 for illustrating an LED power supply device of a conventional type.

For the further description, the reference numbers used in connection with FIG. 4 apply analogously for corresponding components or functional groups.

DETAILED DESCRIPTION

Figure 1:
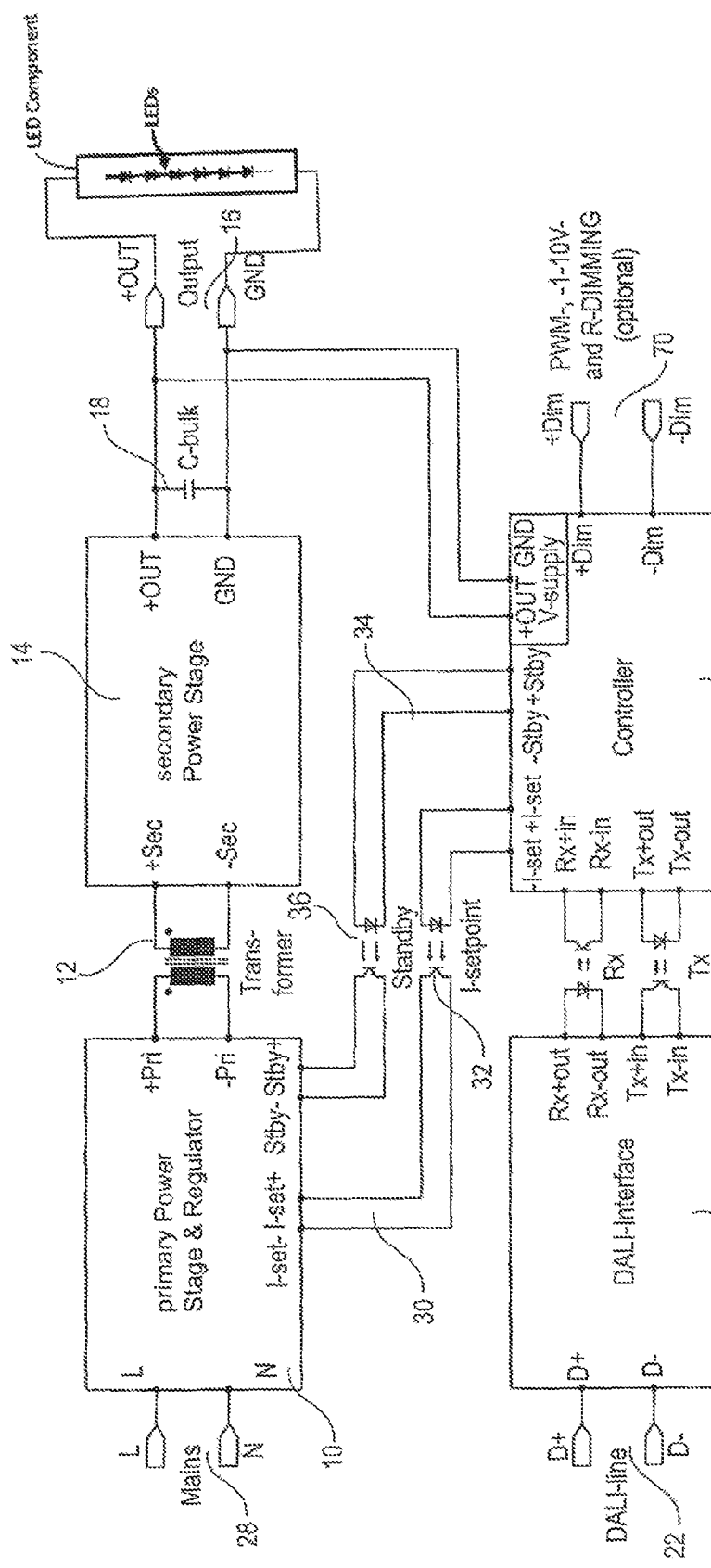
FIG. 1 shows a block diagram of an LED power supply device according to a first preferred embodiment.

FIG. 1 shows an LED power supply device (also referred to herein as "power supply apparatus") as an exemplary embodiment. The terms "power supply device" and "power supply apparatus," as used herein, generally refer to equipment that includes a power supply as well as additional components such as a controller, as detailed further below. The term "power supply," on the other hand, as used herein may refer specifically to components such as a primary stage, secondary stage and transformer, without necessarily including controller and other components. As seen in FIG. 1, the LED power supply device includes a primary stage 10 and a secondary stage 14 of a power supply. The secondary stage 14 is connected downstream to the primary stage 10, via a transformer unit 12. FIG. 1 further illustrates an output-side smoothing-and-buffer capacitor (CBULK) 18, which is arranged electrically parallel to a pair of output connections 16.

In various embodiments, at the output connections 16 an LED component (not shown) is provided. In one example, an LED component may include a series connection of six performance LEDs, which enable a luminous power of approximately 60 watts. The cumulative threshold voltage of this series arrangement lies in the range of approximately 17 to 18 volts.

As shown in the exemplary embodiment of FIG. 1, the primary stage 10 of the power supply comprises a single-phase switching power supply having power factor correction (PFC), which may occur in response to a current-setting signal sent via a control line pair 30. As illustrated, the current-setting signal is sent via an optocoupler unit 32 from a control unit 20. Upstream of the control unit 20 is a DALI interface that includes an interface module 24 and an interface-compliant two-wire connection 22 connected in the previously described manner. In addition, the control unit 20 is coupled via a standby control line 34 and optocoupler 36 to the primary stage 10. Using control line 34, the power supply can be placed into a deactivation state. In particular, the optocoupler 36 may digitally decouple the control unit 20 from the primary stage 10 using an ON/OFF signal. For example, when the optocoupler 36 is actively controlled the power supply is placed in an "OFF" state.

In different embodiments, the power supply components 10, 12, 14 may be arranged differently. In one example, the capacitor 18 has a typical capacitance of 18,000 μF. An exemplary implementation of the power supply components 10, 12, 14 is disclosed in EP 2 259 415 A2 and corresponding U.S. Pat. No. 8,098,506, and in particular, FIG. 1 therein. In particular, the unit 116 of FIG. 1 of EP 2 259 415 A2 may be implemented in the manner disclosed in FIG. 1 of EP 2 270 965 and corresponding U.S. Pat. No. 7,110,270, which together with U.S. Pat. No. 8,098,506, are incorporated by reference herein in their entirety. Advantageously, the primary power stage enables a single phase design with a PFC function, without incurring a significant current inrush, since no energy storage occurs on the primary side. Thus, advantageously, a beneficial load factor can be achieved, in addition to reduced loading of the current supply of the control unit 20, as explained below. Moreover, this facilitates the delivery of a maximum permissible harmonic portion of the current drawn from the mains (standard EN61000-3-2 class C for lighting devices).

The control unit, which in the present embodiments is provided on the secondary side, is coupled to the capacitor voltage of the output side smoothing-and-buffer capacitor 18. As FIG. 3 details, the capacitor voltage is always held above an operating voltage minimum (dashed line 40) and also kept below the (cumulative) LED threshold voltage 42 during the deactivated lighting state of the LED component.

Figure 3:
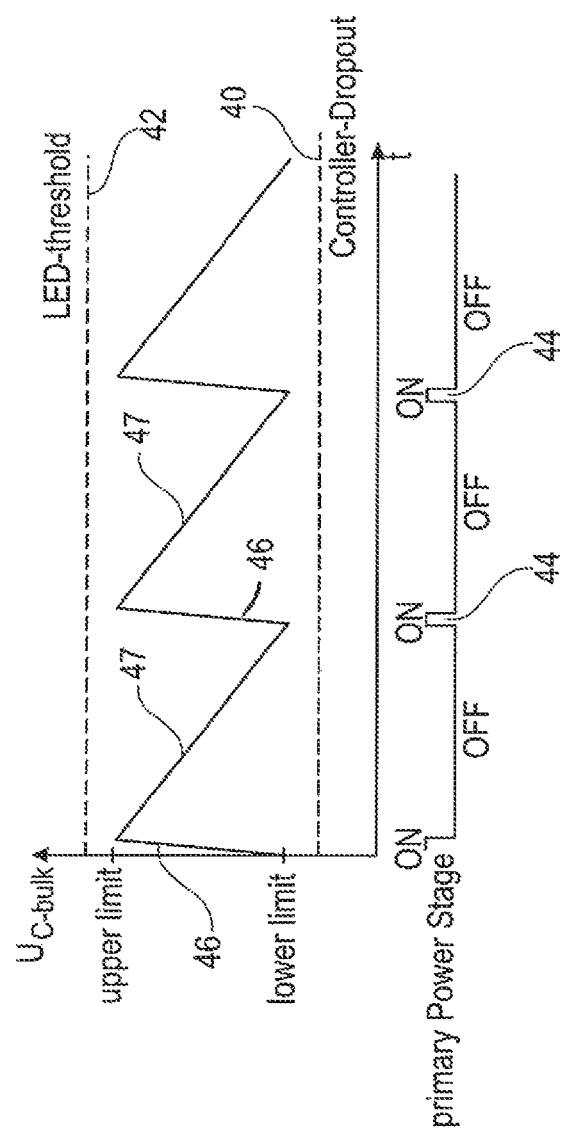
FIG. 3 shows an exemplary signal diagram for showing a curve of the capacitor voltage (upper part of FIG. 3) in the standby state relatively to charge pulses connected through the control unit (lower part of FIG. 3)

In one exemplary implementation, charging of the capacitor unit 18 occurs as follows: during the standby operation of the capacitor 18 shown in FIG. 3, charging is carried out using pulses of the power supply arrangement 10, 12, 14. FIG. 3 depicts a set of regular pulses 44, which result in a steep ramp increase (for example, approximately 2 to 3 msec in duration) 46 to an upper ramp voltage (shown as "upper limit" in FIG. 3). This upper ramp voltage may have a value of approximately 15 volts, which lies below the threshold voltage 42, which may be approximately 17 to 18 volts. At the end of the ON portion of a pulse 44, the capacitor voltage falls during the duration of the OFF portion along a relatively long ramp 47 (for example, approximately 3 to 5 sec), until a subsequent pulse 44 raises the capacitor voltage again. As illustrated, each subsequent pulse 44 is generated before the capacitor voltage reaches the lower operating threshold 40. In various embodiments, a duty cycle for the ON portions of FIG. 3 is approximately 5%, preferably less than 2%, further preferably below 1%.

The operation depicted in FIG. 3 indicates that although the primary stage 10 is activated briefly during the ON periods, during the longer OFF state of the LED at the output 16, the power supply arrangement 10, 12, 14 is deactivated. In the typical case where the ON:OFF ratio is less than 5%, and in the optimum case less than 1%, the average current uptake of the control unit is substantially lower than the nominal load current for controlling the LED load. The averaged energy consumption of the voltage supply operation shown in FIG. 3 thus results in a very low mean power draw from the mains. In particular the mean power draw from the mains may lie below the idling power consumption required by relevant guidelines.

In this manner, since the power supply components themselves perform the role of voltage supply unit in connection with the capacitor 18, additional circuit outlay for a voltage supply unit for the control unit 20 is dispensed with. Moreover, the commonly used capacitor 18, which typically has a large capacitance, is synergistically employed to enable the supply of voltage to the control unit 20 as described above.

Figure 2:
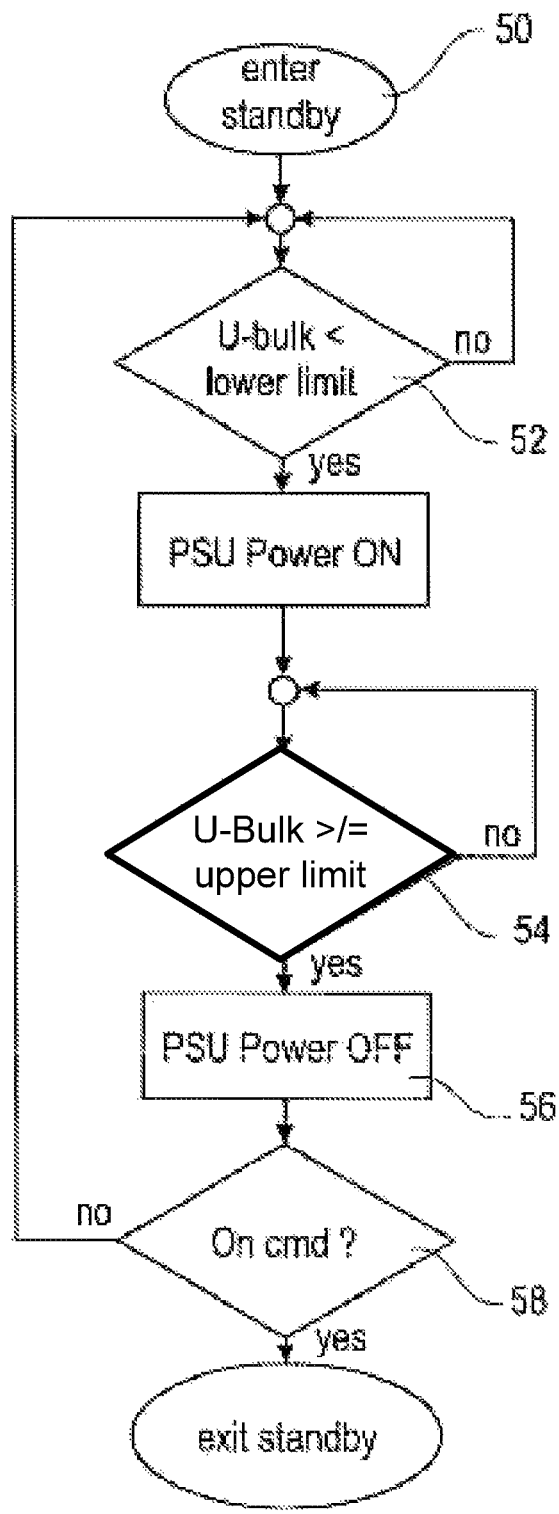
FIG. 2 shows an exemplary flow chart depicting a charging operation mode of the output-side capacitor for supplying voltage to the control unit during a deactivated operating state (standby) of the attached LED load.

FIG. 2 illustrates an exemplary method which may be implemented by means of a software routine. In one example, the software routine is executed by control unit 20 that is embodied as a microcontroller. Referring also to FIGS. 1 and 3 by way of example, a standby state (corresponding to a predetermined signal level) is entered at block 50. In one implementation, a standby command is sent via the DALI interface 22, 24 to a control unit, such as control unit 20. Subsequently, a check is carried out within a first decision loop 52 as to whether the capacitor voltage (U-Bulk) at the output capacitor (see capacitor 18) lies below the operating voltage limit 40 for a voltage supply, such as the voltage supply of the control unit 20. Thereupon, if the operating voltage is below the operating voltage limit, the primary stage, such as primary stage 10, is activated using a control unit, such as control unit 20. In this manner, as illustrated by the increasing signal 46 in FIG. 3, the capacitor voltage increases and may continue to do so until an upper threshold is reached.

At decision step 54 a determination is made as to whether the capacitor voltage has reached or exceeded the upper threshold (see threshold 42 of FIG. 3). If, at decision step 54, the capacitor voltage is reached or exceeded, the method proceeds to step 56, where the charging process is ended (power OFF). The method then proceeds to decision loop 58. In accordance with decision loop 58, as long as the power supply device remains in standby operation and is not switched on again, the method branches back to decision step 52. If an ON command is received, the method proceeds to exit the standby mode.

In the manner disclosed hereinabove, by use of a two stage power supply arrangement, and without any additional power supply unit, a control unit of a power supply apparatus is maintained in continuous operation at an operating voltage below a lighting and response threshold voltage for the lighting means load. Because of the very short switch-on times for the minimum voltage required to maintain the capacitor charging or control unit operating voltage, the effective power consumption due to this additional operating mode remains negligible.

In addition, as illustrated in FIG. 1, because of the galvanic isolation of the controller from the network, in some embodiments, an additional input connection 70 may be provided for the control unit. As depicted in FIG. 1, the input connection 70 can be supplied with a voltage, PWM signal or resistance wiring. This may be useful, for example, for enabling a dimming operation of the power supply, in the event that no DALI (or other) interface to control the lighting means is connected to the power supply device.

Notably, the present invention is not limited to the exemplary embodiments shown. Although the present invention is in particular beneficial for use together with a DALI interface, as described hereinabove, any desired additional configurations of the control unit 20 can be provided to enable a permanent (continuous) operating voltage supply (and therefore reaction readiness) of a power supply during standby operation of an appended load.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. In particular, embodiments in which various configurations of extraction electrodes and plasma chamber in order to provide a desired ion beam for implantation into a substrate are possible. Moreover, an embodiment in which the plasma potential is modulated at various power levels and frequencies is also possible. In addition, embodiments are contemplated in which substrate movements can be either continuous for blanket implants or stepwise for selective emitter implantation. Thus, such other embodiments and modifications are intended to fall within the scope of the present disclosure. Furthermore, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Thus, the claims set forth below should be construed in view of the full breadth and spirit of the present disclosure as described herein.

What is claimed is:

1. A light emitting diode (LED) power supply device, comprising:
   a power supply configured to control an LED component having a threshold voltage;
   a control unit to control the power supply, the control unit having a control interface for applying external control signals to the power supply; and
   a voltage supply unit connected to the power supply,
   wherein the control unit is configured to receive an operating voltage from the voltage supply unit for continuous operation of the control unit in an activated and non-activated control state of the LED component,
   wherein the voltage supply unit comprises a capacitor coupled to an output side of the power supply, the capacitor configured to receive the operating voltage from the voltage supply and to supply a capacitor voltage as operating voltage to the control unit, and
   wherein the control unit is configured to command the power supply to provide electrical pulses across the capacitor at a frequency less than about 1 Hz such that, in the non-activated control state, a maximum capacitor voltage lies below the threshold voltage.

2. The LED power supply device according to claim 1, wherein the capacitor comprises a buffer capacitor disposed at the output side and parallel to the LED component and operable to generate a smoothing of a power supply output voltage.

3. The LED power supply device according to claim 1, wherein the control unit is configured to apply pulse-like control to ensure that a minimum capacitor voltage remains above a minimum operating voltage of the control unit.

4. The LED power supply device according to claim 1, wherein the control unit is configured to arrange the pulse-like control as a series of pulses that take place at regular time intervals.

5. The LED power supply device according to claim 1, wherein the control unit is configured to generate a pulse duration of the series of pulses in the non-activated control state of the LED component that is less than 10 percent of a pulse period.

6. The LED power supply device according to claim 1, wherein the control unit is configured according to a digital addressable lighting interface (DALI) standard.

7. The LED power supply device according to claim 1, wherein the control unit comprises a control input operable to control brightness of the LED component using a pulse-width modulated control signal, a control voltage, or an electrical resistance value.

8. The LED power supply device according to claim 1, wherein at least one control line to the power supply is configured to galvanically decouple the power supply from the control unit.

9. The LED power supply device according to claim 8, wherein a control line to a primary stage of the power supply is configured to galvanically decouple the power supply from the control unit.

10. The LED power supply device according to claim 1, wherein the LED component comprises a plurality of individual LEDs arranged in a series circuit.

11. The LED power supply device according to claim 10, wherein the LED component comprises between 3 and 20 individual LEDs.

12. The LED power supply device of claim 1, wherein the control unit is configured to command the power supply to provide electrical pulses across the capacitor at a lower frequency during the non-activated control state than during the activated control state.

13. The LED power supply device of claim 12, wherein the control unit is configured to command the power supply to provide electrical pulses across the capacitor at a frequency between 0.2 Hz and 0.33 Hz during the non-activated control state, and the power supply is configured to provide electrical pulses across the capacitor at a frequency between 333.34 Hz and 500 Hz during the activated control state.

14. The LED power supply device according to claim 1, wherein the power supply comprises:
a primary stage controlled by the control unit;
a secondary stage that forms the output side of the power supply; and
a transformer configured to isolate the primary stage from the secondary stage.

15. The LED power supply device according to claim 14, wherein the primary stage is configured to be single phase.

16. The LED power supply device according to claim 14, wherein the primary stage receives a current-setting signal via a control line pair for power factor correction.

17. A power supply apparatus, comprising:
a power supply configured to control a light emitting diode (LED) component, the LED component characterized by a threshold voltage;
a control unit to supply control signals to the power supply via a control interface; and
a voltage supply unit comprising a capacitor coupled to an output side of the power supply, the capacitor configured to receive the operating voltage from the voltage supply and to supply a capacitor voltage as operating voltage to the control unit,
wherein the voltage supply unit is configured to supply the operating voltage to enable continuous operation of the control unit in an activated and non-activated control state of the LED component, and
wherein the control unit is configured to command the power supply to provide electrical pulses across the capacitor such that, in the non-activated control state, a maximum charging voltage of the capacitor lies below the threshold voltage.

18. The power supply apparatus according to claim 17, wherein the capacitor comprises a buffer capacitor disposed at the output side of the power supply and arranged in an electrically parallel manner with the LED component, wherein the capacitor is operable to generate a smoothing of a power supply output voltage.

19. The power supply apparatus according to claim 17, wherein the control unit is configured to apply the series of pulses to ensure that a minimum capacitor voltage of the capacitor remains above a minimum operating voltage of the control unit.

20. The power supply apparatus according to claim 17, wherein the control unit is configured to generate a pulse duration of the series of pulses in the non-activated control state of the LED component that is less than 10 percent of a pulse period.

21. The power supply apparatus according to claim 17, wherein at least one control line to the power supply is configured to galvanically decouple the power supply from the control unit.

22. The power supply apparatus according to claim 17, wherein the control unit comprises a control input operable to control brightness of the LED component using a pulse-width modulated control signal, a control voltage, or an electrical resistance value.

* * * * *